US00RE49910E

(19) United States
(12) Reissued Patent
Collins et al.

(10) Patent Number: US RE49,910 E
(45) Date of Reissued Patent: Apr. 9, 2024

(54) SHAPED CHARGE RETAINER SYSTEM

(71) Applicant: Hunting Titan, Inc., Pampa, TX (US)

(72) Inventors: William Richard Collins, Burleson, TX (US); Debra Christine McDonald, Whitney, TX (US); Bradley Dean Schulte, Cleburne, TX (US)

(73) Assignee: Hunting Titan, Inc., Pampa, TX (US)

(21) Appl. No.: 17/535,500

(22) Filed: Nov. 24, 2021

Related U.S. Patent Documents

Reissue of:
(64) Patent No.: 10,488,163
Issued: Nov. 26, 2019
Appl. No.: 15/313,019
PCT Filed: May 21, 2015
PCT No.: PCT/US2015/032054
§ 371 (c)(1),
(2) Date: Nov. 21, 2016
PCT Pub. No.: WO2015/179698
PCT Pub. Date: Nov. 26, 2015

U.S. Applications:
(60) Provisional application No. 62/001,295, filed on May 21, 2014.

(51) Int. Cl.

| | |
|---|---|
| ***E21B 43/116*** | (2006.01) |
| ***F42B 1/02*** | (2006.01) |
| ***F42B 1/036*** | (2006.01) |
| ***F42B 33/02*** | (2006.01) |
| ***F42D 1/04*** | (2006.01) |

(52) U.S. Cl.
CPC ..... *F42B 1/02* (2013.01); *E21B 43/116* (2013.01); *F42B 1/036* (2013.01); *F42B 33/0207* (2013.01); *F42D 1/043* (2013.01)

(58) Field of Classification Search
CPC ..... E21B 43/114; F42B 1/02; F42B 1/036; F42B 33/02; F42D 1/04
See application file for complete search history.

(56) References Cited

U.S. PATENT DOCUMENTS

| | | | | | |
|---|---|---|---|---|---|
| 226,453 | A | * | 4/1880 | Kelly | B60B 17/00 403/348 |
| 1,523,863 | A | * | 1/1925 | Cooke | B26B 21/20 30/83 |
| 3,078,797 | A | * | 2/1963 | Blair | E21B 43/117 102/314 |
| 3,276,369 | A | | 10/1966 | Bell | |
| 3,444,810 | A | * | 5/1969 | Hakala | E21B 43/117 102/310 |
| 4,068,878 | A | * | 1/1978 | Wilner | B66C 1/663 29/559 |

(Continued)

FOREIGN PATENT DOCUMENTS

| | | | | |
|---|---|---|---|---|
| CA | 2590826 | A1 * | 12/2007 | E21B 43/117 |
| EP | 1149981 | A2 * | 10/2001 | E21B 43/117 |
| GB | 1523863 | * | 9/1978 | |

OTHER PUBLICATIONS

Notification concerning transmittal of preliminary report on patentability, PCT Application No. PCT/US2015/032054, dated Dec. 1, 2016, 9 pages.

(Continued)

*Primary Examiner* — Jeffrey R Jastrzab

(57) ABSTRACT

An apparatus and method for locking a detonating cord against a shaped charge.

26 Claims, 5 Drawing Sheets

(56) References Cited

U.S. PATENT DOCUMENTS

| | | | | |
|---|---|---|---|---|
| 4,583,602 | A * | 4/1986 | Ayers | E21B 43/117 175/4.6 |
| 4,832,134 | A * | 5/1989 | Gill | E21B 43/117 102/310 |
| 4,889,183 | A * | 12/1989 | Sommers | E21B 43/117 175/3.5 |
| 5,862,758 | A | 1/1999 | Parrott | |
| 6,378,438 | B1 * | 4/2002 | Lussier | F42B 1/032 102/306 |
| 6,439,121 | B1 * | 8/2002 | Gillingham | C06C 5/06 102/275.12 |
| 10,190,398 | B2 * | 1/2019 | Goodman | F42D 1/05 |
| 2002/0185275 | A1 * | 12/2002 | Yang | E21B 17/1057 166/297 |
| 2010/0230163 | A1 | 9/2010 | Hales et al. | |
| 2013/0019770 | A1 * | 1/2013 | Walker | E21B 43/117 102/322 |

OTHER PUBLICATIONS

Merriam Webster—oblong accessed 2018 (Year: 2018).*
Supplementary European Search Report, EP application No. 15796988.2, dated Oct. 19, 2017, 8 pages.
Office Action, Canadian application No. 2,933,570, dated Jun. 6, 2017, 3 pages.
Response to Office Action, Canadian application No. 2,933,570, dated Dec. 4, 2017, 13 pages.
Notification of transmittal of the international search report and the written opinion of the international searching authority, PCT Application No. PCT/US2015/032054, dated Aug. 17, 2015, 11 pages.

* cited by examiner

SHAPED CHARGE RETAINER SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application claims priority to U.S. Provisional Application No. 62/001,295, filed May 21, 2014.

FIELD

The invention generally relates to perforating guns used in a subterranean environment such as an oil or gas well. More particularly, the invention relates to a fitting that aligns the detonating cord with a shaped charge installed in a carrier tube. The invention has a retainer feature which allows for simplified installation.

BACKGROUND OF THE INVENTION

Generally, when completing a subterranean well for the production of fluids, minerals, or gases from underground reservoirs, several types of tubulars are placed downhole as part of the drilling, exploration, and completions process. These tubulars can include casing, tubing, pipes, liners, and devices conveyed downhole by tubulars of various types. Each well is unique, so combinations of different tubulars may be lowered into a well for a multitude of purposes.

A subsurface or subterranean well transits one or more formations. The formation is a body of rock or strata that contains one or more compositions. The formation is treated as a continuous body. Within the formation hydrocarbon deposits may exist. Typically a wellbore will be drilled from a surface location, placing a hole into a formation of interest. Completion equipment will be put into place, including casing, tubing, and other downhole equipment as needed. Perforating the casing and the formation with a perforating gun is a well known method in the art for accessing hydrocarbon deposits within a formation from a wellbore.

Explosively perforating the formation using a shaped charge is a widely known method for completing an oil well. A shaped charge is a term of art for a device that when detonated generates a focused explosive output. This is achieved in part by the geometry of the explosive in conjunction with an adjacent liner. Generally, a shaped charge includes a metal case that contains an explosive material with a concave shape, which has a thin metal liner on the inner surface. Many materials are used for the liner; some of the more common metals include brass, copper, tungsten, and lead. When the explosive detonates the liner metal is compressed into a super-heated, super pressurized jet that can penetrate metal, concrete, and rock.

A perforating gun has a gun body. The gun body typically is composed of metal and is cylindrical in shape. Within a typical gun tube is a charge holder or carrier tube, which is a tube that is designed to hold the actual shaped charges. The charge holder will contain cutouts called charge holes where the shaped charges will be placed.

A shaped charge is typically detonated by a booster or igniter. Shaped charges may be detonated by electrical igniters, pressure activated igniters, or detonating cord. One way to ignite several shaped charges is to connect a common detonating cord that is placed proximate to the igniter of each shaped charge. The detonating cord is comprised of material that explodes upon ignition. The energy of the exploding detonating cord can ignite shaped charges that are properly placed proximate to the detonating cord. Often a series of shaped charges may be daisy chained together using detonating cord.

SUMMARY OF EXAMPLES OF THE INVENTION

In order to detonate a shaped charge in a perforating gun a continuous detonating cord is placed adjacent to each shaped charge. Holding a detonating cord in place is crucial to ensuring that all of the shaped charges detonate when the detonating cord detonates. Otherwise, unexploded ordinance may end up being brought to the surface, causing a serious safety issue. Furthermore, current means of fastening the shaped charge to the detonating cord require multiple cumbersome means. This invention aims to provide an efficient, easy to use retainer clip that can firmly attach the detonating cord to a shaped charge.

An example of the invention may include a shaped charge retainer comprising an adaptor for holding a shaped charge, a first interface adapted to engage a charge holder, and a second interface adapted to engage a detonating cord. It may include a third interface adapted to engage a shaped charge. The first interface may have an oblong shape for translating into a matching oblong shaped cutout in the charge holder in a first orientation. The rotation of the shaped charge to a second orientation may substantially eliminate at least one degree of freedom of the shaped charge retainer. The shaped charge retainer may prevent disengaging via the inference of the first interface. The second interface may be a clamp for engaging to a detonating cord by rotating it relative to the detonating cord. The second interface may include a plurality of clamps. The second interface may be a u-shaped retainer. The second interface may be a c-shaped retainer. The second interface may include one or more protrusions adapted to restrain a detonating cord. The first interface may have an oblong shape. The first interface may have a non-circular shape. The first interface may be circular in shape. The first interface may be oblong in shape. The first interface may be polygon in shape. The first interface may be threaded. The first interface may be integrally formed to the charge holder. The third interface may be adapted to snap onto the end of a shaped charge. The third interface may be adapted to thread onto the end of a shaped charge. The third interface may be adapted to mechanically fasten to a shaped charge.

Another example of the invention is a detonating cord retainer having a bottom portion adapted to interface with the bottom of shaped charge. Generally the shaped charge end will have a lip or other relevant feature that can be secured to. The bottom portion of the retainer will have a corresponding flange or other snapping mechanism that can fit over the lip of the shaped charge. Once the retainer is attached to the shaped charge, the shaped charge can be installed in a charge tube. The charge tube is a device adapted to contain the shaped charges in a perforating gun. The charge tube will generally have a large hole for fitting the shaped charge through and a smaller hole, radially opposite the large hole, for the retainer to fit through. The retainer in this example can have an unique shape that will match with a similar unique shaped cutout in the charge tube. After the retainer is fitted through the unique shaped hole, it can be rotated, in this case 45 degrees, such that the retainer is in interference with the charge tube and cannot be disengaged. Further, there can be locking features on the retainer that engage additional cutouts on the charge tube to prevent the retainer from rotating once locked.

The first part is the installation of the retainer onto the shaped charge and then installing the combination into a charge tube. The second portion of the device disclosed is a detonating cord restraining mechanism located on the top of the retainer. In this example, the restraining mechanism includes two arches shaped to allow detonating cord to fall into place when the retainer is in the unlocked position. When the retainer is rotated as described above to lock into the charge tube, the orientation of the two arches changes with respect to the detonating cord such that the detonating cord is locked into place in the retainer.

A variation of the examples disclosed may include a charge tube comprising a charge hole cutout adapted to fit a shaped charge within the charge tube, a shaped charge retaining cutout, and a first locking cutout, wherein the first locking cutout is located adjacent to the shaped charge retaining cutout.

Examples may also have the shaped charge retaining cutouts adapted to fit a shaped charge retaining fitting. The shaped charge retaining cutout may be located 180 degrees opposite of the charge hole cutout. Examples may include a plurality of charge hole cutouts in a variety of orientations with respect to each other, sometimes referred to as phase angle. A plurality of shaped charge retaining cutouts would go along with a plurality of charge hole cutouts. The retaining cutouts would include one or more locking cutouts located nearby each retaining cutout. The shaped charge retaining cutouts may have an irregular shape such that only one orientation of a retaining fitting would fit through the retaining cutout. One possible shape for the retaining cutout is an irregular hexagonal shape. The locking cutouts may have circular, rectangular, or irregular shapes. Some embodiments would include at least two locking cutouts for each retaining cutout, located on two different sides of each retaining cutout. The first locking cutout and the shaped charge retaining cutout are oriented such that a shaped charge retainer rotates in order to lock into place.

Another example of the invention includes a shaped charge retainer comprising a base portion with an opening adapted to attach to a shaped charge, a body portion adapted to accept a detonating cord, and a detonating cord retainer portion. The base portion has a flange adapted to engage a shaped charge. The base portion has a cutout adapted to allow the base portion to snap onto a shaped charge. The body portion may further comprise a first rectangular portion and a second rectangular portion substantially parallel to the first rectangular portion. The first rectangular portion may be longer than the second rectangular portion. The detonating cord retainer portion further may include a first detonating cord retainer. The detonating cord retainer portion may include a second detonating cord retainer. The first rectangular portion may include a fillet. The second rectangular portion may contain a fillet. The first detonating cord retainer may contain an arch. The second detonating cord retainer may contain an arch. The first detonating cord retainer and the second detonating cord retainer may be are adapted to accept a detonating cord at a first angle with respect to an axis formed by the substantially parallel first rectangular portion and the second rectangular portion. The apparatus may be adapted to substantially restrain the detonating cord when rotated a second angle.

Another embodiment of the invention may include a method for securing a detonating cord to a shaped charge comprising installing a retainer fitting onto the end of a shaped charge, installing the shaped charge into a charge tube, installing a detonating cord onto the retainer fitting, and rotating the retainer fitting a predetermined number of degrees. The method may include locking the retainer fitting onto the charge tube. The retainer fitting may be rotated approximately 45 degrees. The retainer fitting may be snapped onto place on the shaped charge. The shaped charge may be locked into place on the charge tube.

Another embodiment of the invention may include a perforating gun comprising a charge tube, a plurality of shaped charges, wherein each shaped charge has a retainer fitting, the shaped charge retainer fitting further comprising a base portion with an opening adapted to attach to a shaped charge, a first rectangular portion and a second rectangular portion, wherein the first rectangular portion is substantially parallel to the second rectangular portion, a first detonating cord retainer and a second detonating cord retainer, and a locking mechanism. The base portion may have a flange adapted to engage a shaped charge. The base portion may have a cutout adapted to allow the base portion to snap onto a shaped charge. The first rectangular portion could be longer than the second rectangular portion. The first rectangular portion may contain a fillet. The second rectangular portion may contain a fillet. The first detonating cord retainer may contain an arch. The second detonating cord retainer may contain an arch. The first detonating cord retainer and the second detonating cord retainer may be adapted to accept a detonating cord at a first angle with respect to an axis formed by the substantially parallel first rectangular portion and the second rectangular portion. The apparatus may be adapted to substantially restrain the detonating cord when rotated a second angle.

Another embodiment of the invention may include a perforating gun system comprising a means for containing a plurality of shaped charges, a charge tube, a means for locating a detonating cord proximate to a shaped charge, and a rotational means for securing the detonating cord to the shaped charge. The means for containing a pluriality of shaped charges may include a charge tube. The means for locating a detonating cord proximate to a shaped charge may include a retainer fitting. The rotational means for securing the detonating cord to the shaped charge may comprise a base portion with an opening adapted to attach to a shaped charge, a body portion adapted to accept a detonating cord, and a detonating cord retainer portion.

The embodiment disclosed above may be further modified such that the base portion may have a flange adapted to engage a shaped charge. The base portion may have a cutout adapted to allow the base portion to snap onto a shaped charge. The body portion may further comprise a first rectangular portion and a second rectangular portion substantially parallel to the first rectangular portion. The first rectangular portion may be longer than the second rectangular portion. The detonating cord retainer portion may further comprise a first detonating cord retainer. The detonating cord retainer portion may further comprise a second detonating cord retainer. The first rectangular portion may contain a fillet. The second rectangular portion may contain a fillet. The first detonating cord retainer may contain an arch. The second detonating cord retainer may contain an arch. The first detonating cord retainer and the second detonating cord retainer may be adapted to accept a detonating cord at a first angle with respect to an axis formed by the substantially parallel first rectangular portion and the second rectangular portion. The apparatus may be adapted to substantially restrain the detonating cord when rotated a second angle.

An embodiment of the invention may include an apparatus for use in a perforating gun comprising a charge tube having a first end, a second end, an internal cavity, and a center axis, at least one charge cutout, wherein the circular cutout has an axis that is perpendicular to the axis of the charge tube, a retainer cutout corresponding to each substantially circular cutout, wherein the retainer cutout is located one hundred eighty degrees on the charge tube from the charge cutout, and at least one adjacent locking cutout corresponding each retainer cutout. The embodiment may include a second adjacent cutout for each retainer cutout. Further, the at least charge cutout is may be a plurality of charge cutouts located along the length of the charge tube. Each retainer cutout may have a shape adapted to only fit a retainer in a predetermined orientation. The charge tube may be adapted to fit a shaped charge device with a retainer fitting for each charge cutout and corresponding retainer cutout.

Another embodiment of the invention may include a shaped charge retainer comprising a base portion with an opening adapted to attach to a shaped charge, a body portion with a detonating cord cutout adapted to hold a detonating cord, and a first retainer portion attached to the body portion adapted to retain the detonating cord inside the detonating cord cutout. The embodiment may include the base portion having an adaptor configured to snap onto the end of a shaped charge. The embodiment may include the base portion having a cutout adapted to allow the base portion to flex. The body portion may further comprise a second retainer portion adapted to retain the denotation cord inside the detonating cord cutout. The first retainer portion, the second retainer portion, and the detonating cord cutout may combine to form a u-shaped detonating cord retainer. The first retainer portion and the second retainer portion may both be integral with the body portion. The first retainer portion may contain an arch. The second retainer portion may contain an arch. The base portion my include a through slot. The embodiment may be adapted to substantially restrain a detonating cord from sideways movement.

DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly.

DETAILED DESCRIPTION OF EXAMPLES OF THE INVENTION

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

Figure 1:
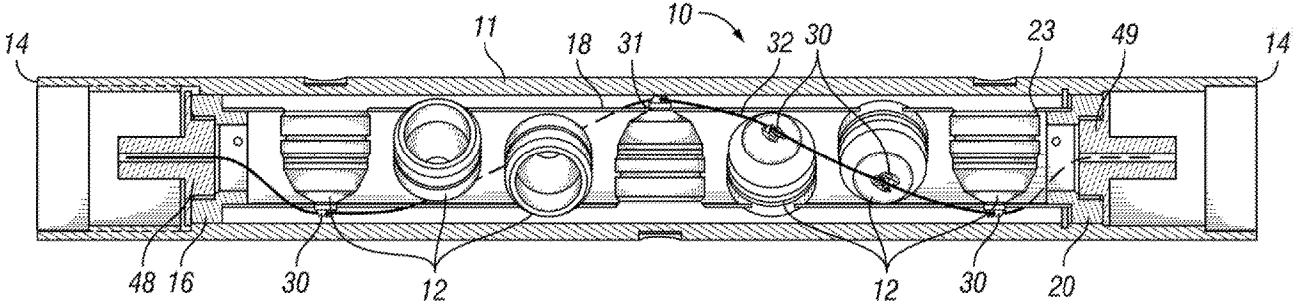
FIG. 1 is a side cross sectioned view of a perforating gun.

Referring to an example shown in FIG. 1, a typical perforating gun 10 comprises a gun body 11 that houses the shaped charges 12. The gun body 11 contains end fittings 16 and 20 which secure the charge holder 18 into place. The charge holder 18 in this example is a charge tube and has charge holes 23 that are openings where shaped charges 12 may be placed. The charge holder 18 has retainer cutouts 31 that are adapted to fit a retainer fitting 30 in a predetermined orientation. The gun body 11 has threaded ends 14 that allow it to be connected to a series of perforating guns 10 or to other downhole equipment depending on the job requirements. In this example the retainer fitting 30 is separate from the charge holder 18, however in another variation of the embodiment that retainer fittings 30 may be integral to the charge holder 18. Each shaped charge 12 has an associated retainer fitting 30 that secures each shaped charge 12 to the charge holder 18 and the detonating cord 32. The detonating cord 32 runs the majority of the length of the gun body 11 beginning at end cap 48 and ending at end cap 49. The detonating cord 32 wraps around the charge holder 18 as shown to accommodate the different orientations of the shaped charges 12. In this embodiment, the shaped charges 12 have an orientation that is rotated 60 degrees about the center axis of the gun body 11 from one shaped charge to the next. Other orientations may have zero angle, where all of the shaped charges 12 are lined up. Other orientations may have different angles between each shaped charge 12. This example using a 60 degree phase is illustrative and not intended to be limiting in this regard.

Figure 2:
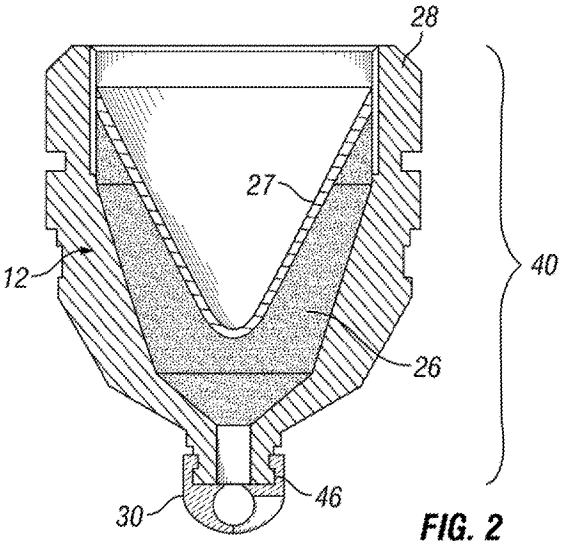
FIG. 2 is a side cross sectioned view of a shaped charge that may be used in a perforating gun with a retainer fitting attached.

Referring to an example shown in FIG. 2, the shaped charges 12 includes a shaped charge case 28 that holds the energetic material 26 and the liner 27. The shaped charge case 28 typically is composed of a high strength metal, such as alloy steel. The liner 27 is usually composed of a powdered metal that is either pressed or stamped into place. The metals used in liner 27 may include brass, copper, tungsten, and lead. The retainer fitting 30 is secured to the end fitting 46 of the shaped charge case 28 by snapping into place over a flange on end fitting 46. The entire assembly 40 includes shaped charge 12 combined with retainer fitting 30. Alternatively, the fitting 30 could be threaded onto the charge case 18, secured with adhesive, snapped around the full length of the charge case, or formed integrally with the charge case. The fitting 30 could also be secured to the charge case 18 using set screws, roll pins, or any other mechanical attachment mechanisms. Alternatively, shaped charge case 28 could be integrally formed to retaining fitting 30. This would result in a single component, thus reducing cost and complexity.

Figure 3A:
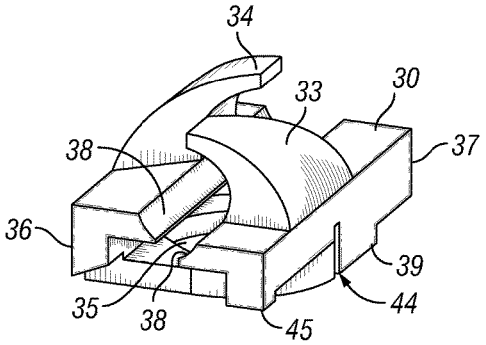
FIG. 3A is a detailed view of a retainer fitting.

Referring to an example shown in FIG. 3A, this is a detail drawing of the retainer fitting 30. The retainer fitting has a first detonating cord retainer 33 and a second detonating cord retainer 34. The retainer fitting 30 has a circular opening 35. The retainer fitting 30 has two rectangular base portions 36 and 37. Base portion 36 is longer than base portion 37. Base portion 36 is parallel to base portion 37. Each of the rectangular base portions 36 and 37 contain fillets 38 that are adapted to accommodate the radius of a detonating cord 51.

The adaptor 39 has a base slot 44, in this example it is perpendicular to the rectangular base portions 36 and 37. The base slot 44 allows some flexibility in the adaptor 39. In this example the adaptor 39 is composed of a plastic material that may deform without yielding. The base slot 44 aids in helping the adaptor 39 yield. This added flexibility allows the adaptor 39 to snap over the end fitting 46 of a shaped charge case 28. The adaptor 39 has an internal flange 47 designed to assist in attaching the retainer fitting 30 to the shaped charge case 28 end fitting 46.

Figure 3C:
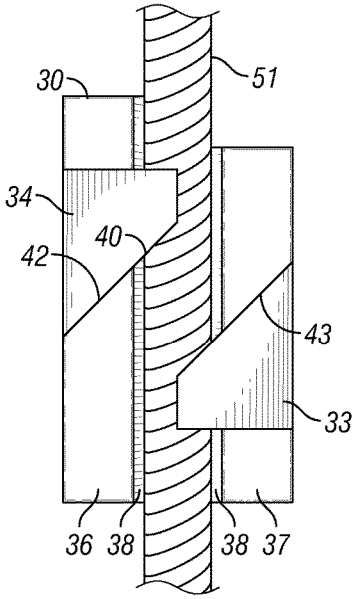
FIG. 3C is a top view of a retainer fitting with a detonating cord in the locked position.
Figure 3B:
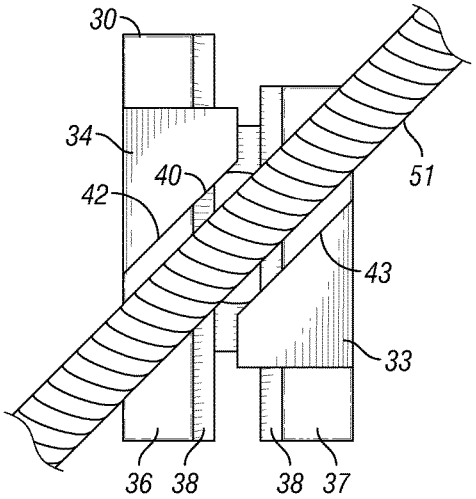
FIG. 3B is a top view of a retainer fitting with a detonating cord in the unlocked position.

In FIG. 3B the retainer fitting 30 has detonating cord retainers 33 and 34. Retainer 34 has an edge 42 that is angled 45 degrees with respect to the parallel axis of rectangular base portions 36 and 37. Retainer 33 has an edge 43 that is also angled 45 degrees with respect to the parallel axis of rectangular base portions 36 and 37. Edge 42 and edge 43 are parallel to each other, forming slot 40. Slot 40 is wide enough to fit detonating cord 32 as depicted in FIG. 3B.

Figure 3D:
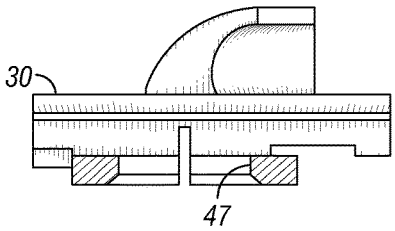
FIG. 3D is a side view of a retainer fitting.

In at least one example, detonating cord retainers 33 and 34 are shaped as arches as viewed from the side in FIG. 3D. The procedure for securing the detonating cord 51 is to first place it into slot 40 as shown in FIG. 3B. Then, rotating the retainer fitting 30 45 degrees detonating cord retainers 33 and 34 force the detonating cord 32 against the fillets 38 as shown in FIG. 3C.

FIG. 3B shows the detonating cord 51 as it is initially placed in the retainer fitting 30. FIG. 3C depicts the detonating cord 51 as it sits in the retainer fitting 30 after the retainer fitting 30 has been rotated and locked into place on the charge holder 18.

Figure 3E:
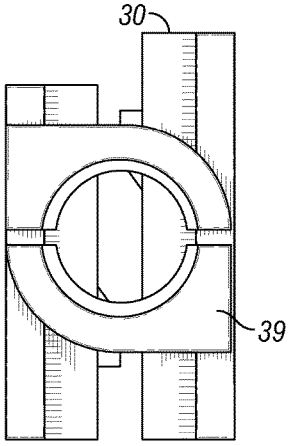
FIG. 3E is a bottom view of a retainer fitting.

As seen in FIG. 3E the retainer fitting 30 has an adaptor 39 which allows for the retainer fitting 30 to snap into place on the end fitting 46 of the shaped charge case 28 upon installation.

Figure 4:
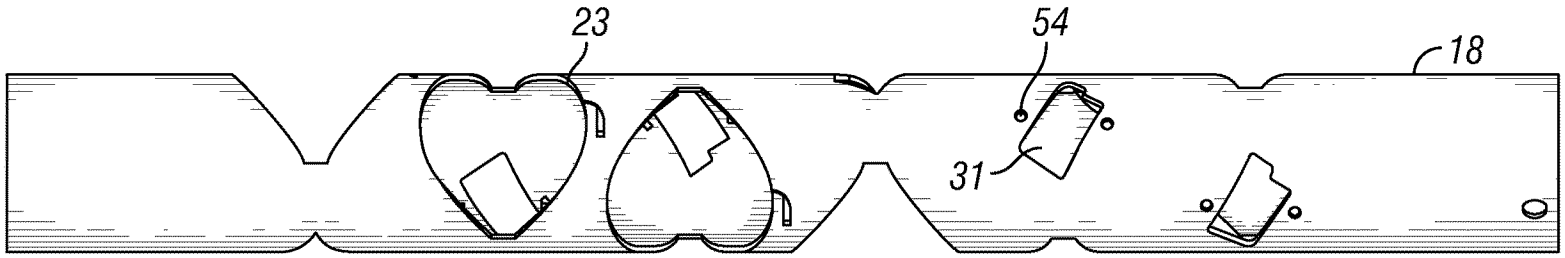
FIG. 4 is a side view of a charge tube adapted for use with a retainer fitting.

Referring to FIG. 4, the charge holder 18 has the retainer cutout 31 and lock cutouts 54. Installation may include snapping a retainer fitting 30 on each shaped charge 12. The assembled shaped charge 12 with associated retainer fitting 30 is then placed through the charge hole 23 of the charge holder 18 until the retainer fitting 30 exits through the retainer cutout 31. The retainer fitting 30 has a lock block 45. The charge holder 18 has a lock cutout 54 associated with each retainer cutout 31. The retainer fitting 30 can be rotated until slot 40 is aligned with the detonating cord 51 as shown in FIG. 3B. The detonating cord 51 is then placed into slot 40. Then the retainer fitting is rotated, or twisted, until the lock block 45 engages the lock cutout 54. Once twisted, the detonating cord 51 and retainer fitting 30 will look as depicted in FIG. 3C. As can be seen in FIG. 4, the retainer cutout 31 is shaped uniquely such that a retainer fitting 30 can only fit into the charge holder 18 in one specific angular orientation. Once the retainer fitting 30 is rotated to a second angular orientation it will interfere with the shape of the retainer cutout 31, preventing the retainer fitting 30 from being able to disengage unless it is rotated back to the original angular orientation.

The retainer fitting 30 has a lock block 45 that is adapted to fit into the lock cutout 54 on the charge holder 18 as shown in FIG. 4. The lock block 45 is engaged by twisting the retainer fitting until it reaches the desired orientation whereby the lock block 45 and lock cutout 54 are aligned. Engagement of the lock block 45 with lock cutout 54 will keep the retainer fitting 30 from rotating further. Alternatively, the lock block 45 may be eliminated or replaced by other mechanical or friction fit means, such as angling or texturing the undersides of the adaptor 39.

As can be seen from the shape of the retainer cutout 31, it can only accommodate the retainer fitting 30 in a specific orientation. Once the retainer fitting 30 has cleared the retainer cutout 31, it will be oriented to lay the detonating cord 51 along slot 42. Then the shaped charge 12 and retainer fitting 30 assembly 40 is rotated, at least in this example, approximately 45 degrees. Rotating the assembly 40 causes the detonating cord 51 located with the slot 42 to be locked into place against the fillets 38 and the cord retainers 33 and 34. The arch design of retainers 33 and 34 force the detonating cord 51 against the fillets 38 upon alignment. Further, once rotated 45 degrees, the retainer fitting is locked into the charge holder 18 by the lock block 45 plugging into the lock cutout 46. The retainer fitting 30 can be composed of materials common in the industry, including metal and plastics. The retainer fitting 30 can be manufactured using injection molding techniques, casting, rapid prototyping, machining techniques, or other common manufacturing techniques known in the art.

Figure 5A:
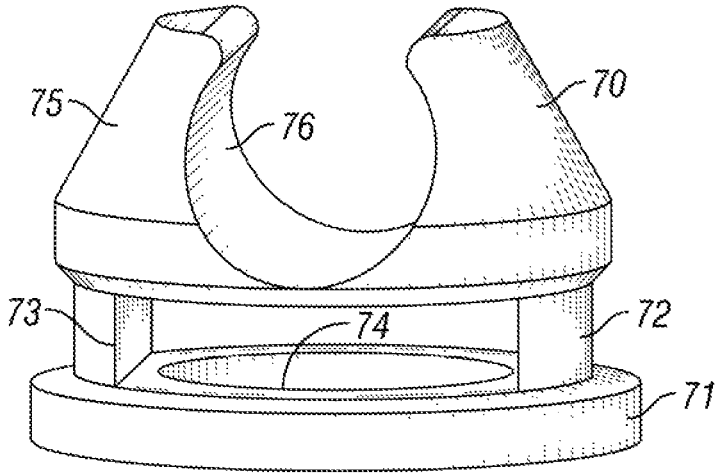
FIG. 5A is a perspective view of a detonating cord retainer.
Figure 5B:
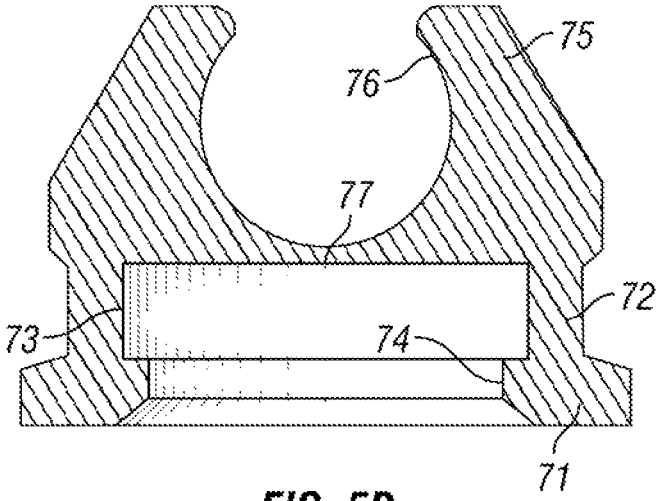
FIG. 5B is a cross-section view of a detonating cord retainer.

Another embodiment of the invention is depicted in FIGS. 5A and 5B. This detonating cord retainer 70 has a base 71 with a through hole 74, a middle portion 72 with a through slot 73, and a upper portion 75 that is shaped as a truncated conical with a u-shaped cutout 76 that is sized to snap onto a detonating cord. The base 71 snaps onto the end of a shaped charge with the edge of the u-shaped cutout 76 adapted to snap over a lip. The detonating cord retainer 70 can be secured to the shaped charge, but still rotate to its desired orientation in order to snap to a detonating cord. The u-shaped cutout 76 is designed to securely snap onto a detonating cord and restrict the movement of the detonating cord. In this embodiment the detonating cord could explode through the thin material 77 between the u-shaped cutout 76 and the through slot 73, whereby the explosion would travel down the through hole 74 and into the back of a shaped charge. In the alternative, a through hole could be placed at the thin material 77 to facilitate the explosion traveling from the detonating cord into the shaped charge. An alternative to the u-shaped cutout 76 is a c-shaped cutout wherein the cutout 76 is rotated 90 degrees such that the detonating cord is accepted from the side rather than the top as shown.

Figure 6:
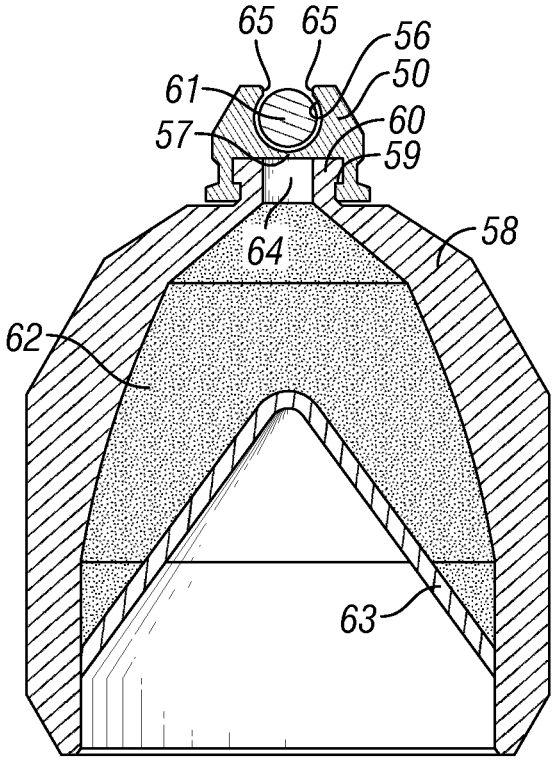
FIG. 6 is a cross-section side view of a detonating cord retainer attached to a shaped charge case.

In FIG. 6 the shaped charge case 58 is attached to the detonating cord retainer 50. The shaped charge case is machined with an end adaptor 60. The end adaptor 60 has a lip 59. The detonating cord retainer 50 snaps over the lip 59. Alternatively, the detonating cord retainer 50 could be threaded onto the charge case 58, secured with adhesive, snapped around the full length of the charge case 58, or formed integrally with the charge case 58. The detonating cord retainer 50 could also be secured to the charge case 58 using set screws, roll pins, or any other mechanical fasteners. The detonating cord 61 is snapped into the u-shaped cutout 56. In this example the detonating cord retainer 50 can freely rotate when attached to the shaped charge case 58, however a set screw or other fastening device could be used to prevent rotation if desired. When the detonating cord 61 detonates the explosion will puncture through the thin material 57 and enter through hole 64 of the shaped charge case 58. The explosion will then interact with the explosive material 62 causing it to explode. The detonation of explosive material 62 will then transform liner 63 into a plasma jet capable of puncturing out of the perforating gun. The thin material 57 may be solid, it could also have a through hole, perforations, a window or other aid that facilitates the explosion traveling from the detonating cord 61 to the explosive material 62. Furthermore, in this embodiment the u-shaped cutout 56 is depicted as having a gap between the two retaining ends 65, however the gap could be narrower such that the retaining ends 65 touch each other either before or after the detonating cord 61 is put into place. The detonating cord retainer 50 may be constructed of plastic using for instance an injection molding process or a rapid prototyping process. The detonating cord retainer 50 in this embodiment restricts the ability of the detonating cord 61 to move sideways, but it may allow the detonating cord to move through the detonating cord retainer 50 and allows for rotation of the detonating cord 61 with respect to the shaped charge case 58.

Another alternative to the embodiments disclosed may include using the adaptor base 39 and combining it with the u-shaped upper portion 75 from the detonating cord retainer 50. The adaptor base may also have different oblong shapes, including oval shapes, triangular, or other polygons, to allow the adaptor base 39 to lock into the charge holder 18 when rotated.

Other alternatives to the embodiments disclosed include using a single base portion instead of the separate base portions 36 and 37. Alternatively, the base portion may have a different oblong shape such as an oval, triangle, or other polygon. Another alternative may include have the retainers 33 and 34 contact and secure to one and other through a fastening mechanism, allowing for a more secure connection between the retainer fitting and the detonation chord. Another variation may include using a circular base, with retainers that connect to one another, securing the detonation chord, and then using a circular adaptor such that the fitting could turn freely with respect to the charge case. This design would allow for optimal wiring of the detonation chord. Once the detonation chord is in its final orientation, a set screw, resilient tabs, or other retaining device could be used to secure the fitting to the case or to the shaped charge in order to prevent movement. In the embodiments disclosed above, two lock blocks 45 and two lock cutouts 54 are disclosed, however more or fewer of either item could be used to secure the retainer fitting to the charge tube. The fitting could be threaded onto the charge case, secured with adhesive, snapped around the full length of the charge case, or formed integrally with the charge case. The fitting could also be secured to the charge case using set screws, roll pins, or any other mechanical attachment mechanisms. Further, charge cases in the examples herein are shown as cylindrical devices with cutouts, however other configurations are possible for holding shaped charges in a perforating gun. For example, a charge strip can be used wherein a long strip of metal containing holes for the retainer to engage with is used to hold a linear series of shaped charges in a perforating gun. Other examples may include cylinders with one a single cutout for the retainer and no cutout for the shaped charge. Another example may include a perforating gun that does not use a cylindrical charge holder to contain the shaped charges. Another example may include a charge holder that is integral to the perforating gun.

Although the invention has been described in terms of particular embodiments which are set forth in detail, it should be understood that this is by illustration only and that the invention is not necessarily limited thereto. Alternative embodiments and operating techniques will become apparent to those of ordinary skill in the art in view of the present disclosure. Accordingly, modifications of the invention are contemplated which may be made without departing from the spirit of the claimed invention.

What is claimed is:

1. A cylindrical charge holder for use in a perforating gun comprising:

at least one charge hole located axially about the center *of the cylindrical charge holder* adapted to fit at least one shaped charge disposed therein;

at least one retainer cutout located axially about the center *of the cylindrical charge holder* and opposite of the at least one charge hole and having an irregular rectangular shape, wherein the retainer cutout is adapted to accept a retainer fitting adapted to couple to the end of a shaped charge and inserted or removed therethrough in only a first angular orientation, and once inserted may be locked into position by rotating it to a second angular orientation.

2. The apparatus of claim 1, further comprising a first locking cutout located adjacent to the at least one retainer cutout, wherein the first locking cutout locks with a portion of a retainer fitting at the second angular orientation.

3. The apparatus of claim 1, further comprising a plurality of charge hole cutouts and a plurality of corresponding retainer cutouts.

4. The apparatus of claim 3, further comprising a plurality of corresponding first locking cutouts, each located adjacent to its corresponding retainer cutout.

5. The apparatus of claim 4, wherein the first locking cutouts have a rectangular shape.

6. A retainer fitting for use on a shaped charge in a perforating gun comprising:

a base portion having an opening adapted to [attached] *attach to* a shaped charge, a cutout adapted to allow the base portion to snap onto a shaped charge, and having an overall irregular rectangular shape adapted to fit into a corresponding irregular rectangular shaped retainer cutout on a charge holder in only a first angular orientation and locking into position at a second angular orientation; and a detonating cord retainer portion.

7. The apparatus of claim 6 wherein the base portion is integral to a charge case.

8. The apparatus of claim 6, wherein the overall irregular rectangular shape of the body portion further comprises a first rectangular portion and a second rectangular portion substantially parallel to the first rectangular portion.

9. The apparatus of claim 6, the detonating cord retainer portion further comprising a first detonating cord retainer.

10. The apparatus of claim 9, the detonating cord retainer portion further comprising a second detonating cord retainer.

11. The apparatus of claim 9 wherein the first detonating cord retainer comprises an arch.

12. The apparatus of claim 10 wherein the second detonating cord retainer comprises an arch.

13. The apparatus of claim 10 wherein the first detonating cord retainer and the second detonating cord retainer are adapted to accept a detonating cord at the first angular orientation and to substantially restrain the detonating cord when rotated to the second angular orientation.

14. A method for installing a shaped charge onto a charge holder comprising:

[with an irregular rectangular shape attached thereto] inserting [the] *a* retainer fitting *with an irregular rectangular shape* through an opening in the charge holder *adapted to receive the irregular rectangular shape* at only a first angular orientation;

rotating the retainer fitting to a second angular orientation; and locking the retainer fitting at the second angular orientation.

15. The method of claim 14, wherein the charge holder is a charge tube with a charge hole.

16. The method of claim 15, further comprising inserting the shape charge through a charge hole.

17. The method of claim 14 further comprising installing [a] *the* retainer fitting onto the end of the shaped charge.

18. The method of claim 14, wherein the second angular orientation is approximately 45 degrees.

19. The method of claim 14, [mer] *further* comprising snapping the retainer fitting onto the shaped charge.

*20. A shaped charge retention system comprising:*

*a shaped charge case with a first end and an explosive discharge end;*

*a charge tube with a center axis, having a first plurality of circular cutouts adapted for interfacing with a shaped charge case first end and a second plurality of circular cutouts located 180 degrees opposite of the first plurality of cutouts about the charge tube axis;*

*a detonating cord; and*

*a retainer, separate from the charge case with a channel adapted to accept a detonating cord, coupled to the first end of the charge case;*

*wherein the retainer comprises two retaining ends defining a gap smaller that the width of the channel and the width of the detonating cord, capturing the detonating cord within the channel;*

*wherein the shaped charge case is located within the charge tube such that the first end is coupled to a first circular cutout with the retainer and the explosive discharge end is located adjacent to a second circular cutout.*

*21. The system of claim 20, wherein the retainer is composed of plastic.*

*22. The system of claim 20, wherein the retainer can pivot about the shaped charge case first end in 360 degrees.*

*23. The system of claim 20, wherein the retainer is further coupled to the detonating cord.*

*24. The system of claim 20, further comprising a plurality of shaped charges.*

*25. The system of claim 20, further comprising a plurality of retainers.*

*26. The system of claim 20, wherein the channel is a u-shaped cutout.*

* * * * *